United States Patent [19]

Nitoh et al.

[11] Patent Number: 4,885,321

[45] Date of Patent: Dec. 5, 1989

[54] POLYARYLENE SULFIDE RESIN COMPOSITION AND MOLDED ARTICLE FOR LIGHT REFLECTION

[75] Inventors: Toshikatsu Nitoh; Kazutomo Tokushige, both of Fuji, Japan

[73] Assignee: Polyplastics Co., Ltd., Osaka, Japan

[21] Appl. No.: 341,975

[22] Filed: Apr. 24, 1989

[30] Foreign Application Priority Data

Apr. 25, 1988 [JP] Japan .................................. 63-102093

[51] Int. Cl.$^4$ ................................................. C08J 9/32
[52] U.S. Cl. ..................................... 523/219; 521/54; 523/218; 524/609
[58] Field of Search ................ 523/218, 219; 524/609; 521/54

[56] References Cited

U.S. PATENT DOCUMENTS

| | | | |
|---|---|---|---|
| 4,051,096 | 9/1977 | Koseki | 523/219 |
| 4,211,687 | 7/1980 | Salee | 524/605 |
| 4,251,429 | 2/1981 | Salee | 524/539 |
| 4,256,625 | 3/1981 | Dachs | 524/604 |
| 4,278,785 | 7/1981 | Rosenfeld | 528/271 |
| 4,284,549 | 8/1981 | Salee | 524/605 |
| 4,304,901 | 12/1981 | O'Neill et al. | 524/539 |
| 4,305,862 | 12/1981 | Salee | 524/539 |
| 4,444,960 | 4/1984 | Salee | 525/534 |
| 4,518,764 | 5/1985 | Tanaka et al. | 528/271 |
| 4,605,586 | 8/1986 | Lane | 428/240 |
| 4,640,971 | 2/1987 | Echigo et al. | 524/401 |
| 4,778,695 | 10/1988 | Echigo et al. | 528/140 |
| 4,798,762 | 1/1989 | Okada et al. | 428/285 |

*Primary Examiner*—Morton Foelak
*Attorney, Agent, or Firm*—Depaoli & O'Brien

[57] ABSTRACT

A polyarylene sulfide resin composition comprises (A) 100 parts by weight of a polyarylene sulfide resin and (B) 5 to 400 parts by weight of a hollow microspherical filler which comprises 20 to 80% by weight of $SiO_2$ and 20 to 80% by weight of $Al_{21}O_3$ as major components and has a specific gravity of 1.0 to 2.5 and an average particle diameter of 1 to 100 μm

12 Claims, No Drawings

POLYARYLENE SULFIDE RESIN COMPOSITION AND MOLDED ARTICLE FOR LIGHT REFLECTION

BACKGROUND OF THE INVENTION

The present invention relates to a polyarylene sulfide resin composition. In particular, the invention relates to a polyarylene sulfide resin composition which has improved surface properties, fluidity and specific gravity and is inexpensive and a molded article prepared by molding the same.

Recently, thermoplastic resins which have high resistance to heat and chemicals and are flame-retardant have been demanded as materials used for components in electrical and electronic appliances, automobile devices and chemical instruments. A polyarylene sulfide resin represented by polyphenylene sulfide is one of the resins satisfying this demand. Polyarylene sulfide has a good cost performance, so that the demand therefor has increased. Generally, the polyarylene sulfide resin is blended with a large amount of a filler with the purpose of reducing the cost and warpage thereof.

However, the composition thus obtained has disadvantages due to the influence of the filler used. The filled composition provides for molded articles poor in surface smoothness and such composition exhibits lowered fluidity and increased specific gravity. Though it has been expected to apply filled polyarylene sulfide compositions to a field requiring excellent heat resistance and surface properties, for example, automobile lamp reflector, such application has not been realized as yet.

Generally, the following methods are employed in order to improve the disadvantages of filled polyarylene sulfide compositions:

(1) the use of a low-molecular weight polymer excellent in fluidity, and
(2) the reduction in the amount of the filler added.

However, these methods cannot sufficiently solve the disadvantages.

For example, method (1) has disadvantages in that the resulting composition exhibit lowered mechanical strength, the method has no effect upon reducing the specific gravity and it cannot sufficiently improve the surface properties, while method (2) has disadvantages in that it yields a molded article lowered in heat resistance (such as thermal deformation temperature) and resistance to warpage and deformation and it brings about an unavoidable increase in the cost, though it is effective in lowering the specific gravity.

SUMMARY OF THE INVENTION

The purpose of the present invention is to improve the surface properties and fluidity of a polyarylene sulfide resin composition, in particular a polyphenylene sulfide resin composition, without increasing the cost, and while maintaining the inherent excellent heat resistance of polyarylene sulfide. The inventors of the present invention have found that a polyarylene sulfide resin composition containing a specific hollow microspherical filler has extremely excellent fluidity and yields molded articles having excellent surface properties and having a lowered specific gravity.

More specifically, the present invention provides a polyarylene sulfide resin composition comprising (A) 100 parts by weight of a polyarylene sulfide resin and
(B) 5 to 400 parts by weight of a hollow microspherical filler which comprises 20 to 80% by weight of $SiO_2$ and 20 to 80% by weight of $Al_2O$ as major components and has a specific gravity of 1.0 to 2.5 and an average particle diameter of 1 to 100 μm, and a molded article for light reflection such as a lamp reflector which is prepared by molding the same.

Further, it has been also found that a composition further containing 10 to 200 parts by weight of a filler other than the component (B), particularly glass fiber, in addition to the above components (A) and (B) is improved not only in the above respects but also in mechanical properties, so that it is more useful for some practical purposes.

The resin (A) to be used as the base in the present invention is a polyarylene sulfide resin comprising at least 70 molar % of repeating units represented by the structural formula: ${Ar-S}$ (wherein Ar is an aryl group). A representative example thereof is polyphenylene sulfide comprising at least 70 molar % of repeating units represented by the structural formula: ${Ph-S}$ (wherein Ph is a phenyl group) (hereinafter the resin will be abbreviated to "PPS"). Particularly, it is suitable to use PPS having a melt viscosity of 10 to 20000 P, preferably 100 to 5000P as determined at 310° C. with a shear rate of 1200/sec.

Known polyarylene sulfide resins are classified into a group comprising substantially linear ones free from branched or crosslinked structure and another group comprising ones having a branched or crosslinked structure, the difference in the structure resulting mainly from the preparation process thereof. Although any resin of either group or any mixture of a resin of one group with that of the other group can be used in the present invention, it is more effective to use a linear one free from any branched structure.

Preferred examples of the PPS polymer to be used in the present invention include those comprising at least 70 molar %, still preferably at least 80 molar %, of p-phenylene sulfide units:

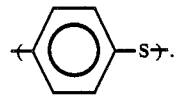

If the content of this unit is less than 70 molar %, the crystallinity of the resulting polymer will be too low to attain a sufficiently high strength and the toughness thereof will be also poor, though high crystallinity is a characteristic of a crystalline polymer.

The linear PPS polymer to be used in the present invention may contain at most 30 molar % of other comonomer units and examples thereof include a m-phenylene sulfide unit: 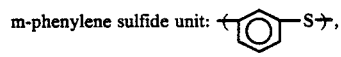

a diphenyl ketone sulfide unit: 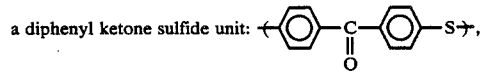

-continued a diphenyl sulfone sulfide unit: +⟨O⟩—SO$_2$—⟨O⟩—S+, a diphenyl sulfide unit: +⟨O⟩—⟨O⟩—S+, a diphenyl ether sulfide unit: +⟨O⟩—O—⟨O⟩—S+, a 2,6-naphthalene sulfide unit: +⟨OO⟩—S+ and a trifunctional unit: —⟨O⟩⟨S—⟩ ).

It is preferable from the standpoint of inhibiting the lowering in the crystallinity that the content of a trifunctional unit be 1 molar % or below.

Particularly preferred examples of the PPS polymer to be used in the present invention include a linear PPS homopolymer composed of p-phenylene sulfide units:

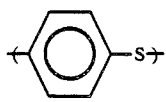

and linear block copolymers comprising 70 to 95 molar % of p-phenylene sulfide repeating units:

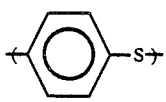

and 5 to 30 molar % of m-phenylene sulfide repeating units:

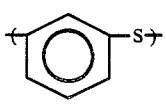

The base resin of the present invention may additionally contain a small amount of another thermoplastic resin as long as the objects of the invention are not hindered. The added thermoplastic resin may be any one, as long as it is stable at high temperature. Examples thereof include aromatic polyesters comprising aromatic dicarboxylic acids and diols or hydroxycarboxylic acids, such as polyethylene terephthalate and polybutylene terephthalate; polyamide, polycarbonate, ABS, polyphenylene oxide, polyalkyl acrylate, polyacetal, polysulfone, polyether sulfone, polyether imide, polyether ketone and fluororesins. The thermoplastic resins may also be added as a mixture of two or more resins.

The hollow microspherical filler to be used as the component (B) in the present invention is a hollow microspherical aluminum silicate comprising 20 to 80% by weight of $SiO_2$ and 20 to 80% by weight of $Al_2O_3$. The filler is generally prepared by treating a natural silicate at high temperature to expand it. Generally, a hollow microspherical filler has a high extent of expansion. Therefore, when such filler is added to a resin, the hollow filler contained therein is broken by extrusion or injection owing to the insufficient mechanical properties of the filler. Unfortunately, articles molded therefrom have a variable specific gravity, although exhibiting a reduced specific gravity. In order to solve this problem, the inventors of the present invention have attempted to improve the mechanical properties of the filler by reducing the extent of expansion thereof.

Namely, the hollow microspherical filler to be used in the present invention mush have a specific gravity of 1.0 to 2.5, preferably 1.8 to 2.4 in order to inhibit the breakage thereof by processing.

Generally, a hollow microspherical filler has a particle diameter of 1 to 500 μm. According to the present invention, it is necessary from the standpoint of both the resistance of the filler to breakage and the surface properties and fluidity of the resin composition that the filler to be used therein has a particle diameter of 1 to 100 μm, preferably 2 to 60 μm.

As described above, the hollow microspherical filler (B) to be used in the present invention has a chemical composition of an aluminum silicate, i.e., comprises 20 to 80% by weight of $SiO_2$ and 20 to 80% by weight of $Al_2O_3$, preferably 40 to 60% by weight of $SiO_2$ and 25 to 40% by weight of $Al_2O_3$.

In this connection it is to be noted that the contamination of the filler with a small amount of an oxide or hydroxide of Fe, Ti, Ca, Mg, K or the like does not exert any adverse effect upon the object of the present invention.

The amount of the hollow microspherical filler (B) to be added is 5 to 400 parts by weight, preferably 10 to 200 parts by weight, per 100 parts by weight of the polyarylene sulfide resin to be used. If the amount is less than 5 parts by weight, the objective improvement in the physical properties such as heat resistance will not sufficiently be attained, while if it exceeds 400 parts by weight, the mechanical properties will be unfavorably lowered.

The composition of the present invention may further contain an inorganic or organic filler (C) other than the component (B) depending upon its object.

Although the filler (C) is not necessarily an essential component in the present invention, the addition thereof is preferable for producing a molded article which has excellent mechanical properties, heat resistance, dimensional stability (resistance to deformation and warpage), electrical properties and other performances. The filler (C) may be selected from among fibrous, powdery, granular and flaky ones depending upon the object. Particularly, it is preferable to use a fibrous filler together with the component (B).

The fibrous filler includes inorganic fibrous materials, for example, glass fiber, carbon fiber, asbestos fiber, silica fiber, silica/alumina fiber, aluminum fiber, zirconia fiber, boron nitride fiber, silicon nitride fiber, boron fiber, potassium titanate fiber and fibers of metals such as stainless steel, aluminum, titanium, copper or brass. Further, the fibrous filler includes high-melting organic fibrous materials and particular examples thereof include polyamides, fluororesins and acrylic resins. Among them, glass fiber is most representative.

The simultaneous use of a fibrous filler, particularly glass fiber, with the hollow microspherical filler (B) brings about a remarkable improvement in the mechanical properties and thermal deformation temperature, substantially without exerting any adverse effect upon the objective physical properties.

Although the glass fiber to be used in the present invention as the component (C) may be any conventional one and the size thereof is not particularly limited, it is preferable to use a glass fiber having a diameter of 3 to 20 μm and a length of 0.03 to 15 mm.

Although the chemical composition of the glass fiber may be either A-glass or E-glass, it is particularly preferable to use E-glass, because the E-glass has a lesser tendency to leach components when kneaded with a resin.

Alternatively, the composition of the present invention may contain a powdery, granular or flaky filler, as long as the objects of the present invention are not adversely affected thereby.

The powdery or granular filler includes carbon black, graphite, silica, quartz powder, glass bead, milled glass fiber, glass balloon, glass powder, silicates such as calcium silicate, aluminum silicate, kaolin, talc, clay, diatomaceous earth and wollastonite; metal oxides such as iron oxides, titanium oxide, zinc oxide, antimony trioxide and alumina; metal carbonates such as calcium carbonate and magnesium carbonate; metal sulfates such as calcium sulfate and barium sulfate; ferrite, silicon carbide, silicon nitride, boron nitride and various metal powders.

The flaky filler includes mica, glass flake and various metal foils.

These organic or inorganic fillers may be used alone or as a mixture of two or more of them as the component (C).

The amount of the filler (C) such as glass fiber to be added is preferably at most 200 parts by weight, still preferably 10 to 130 parts by weight, per 100 parts by weight of the polyarylene sulfide resin. The use of more than 200 parts by weight of the filler (C) is unfavorable, because the glass fiber comes up to the surface of the resulting molded article to result in poor surface properties.

Prior to the addition to a resin, a part or the whole of the components (B) and (C) to be used in the present invention may be treated with a surface treatment or a coupling agent. Examples of the treatment and coupling agent include functional compounds such as epoxy, isocyanate, silane and titanate compounds and other thermoplastic resins.

Further, the composition of the present invention may suitably contain an additive which is conventionally added to a thermoplastic or thermosetting resin, depending upon the performance required. Examples of such an additive include stabilizers such as antioxidant and ultraviolet absorber, antistatic agent, flame retardant, coloring agent such as dye and pigment, lubricant, crystallization accelerator and nucleating agent.

The polyarylene sulfide resin composition of the present invention can be prepared by a conventional process for the preparation of a synthetic resin composition and with conventional equipment therefor. Namely, necessary components are mixed and kneaded and extruded with a single- or twin-screw extruder to give a pellet. In the preparation, a part of the necessary components may be mixed, as a master batch, with the residual part thereof, followed by molding. Alternatively, in order to facilitate the dispersion and mixing of necessary components, a part or the whole of the resinous components may be preliminarily ground, followed by mixing and extrusion.

As described above, the polyarylene sulfide resin composition of the present invention has the following advantages:

(1) the composition of the present invention exhibits a low melt viscosity and an excellent fluidity, even when its filler content is high, (2) the specific gravity of the molded article according to the present invention is low, since the filler contained therein is hollow, and the low specific gravity is constantly attained, because the filler does not cause breakage during the molding unlike other hollow fillers, (3) the surface properties of the structural body according to the present invention are so excellent that a good mirror surface can be prepared by aluminizing the body, and when, for example, the structural body is used for a lamp reflector, the heat resistance, mirror surface properties, stiffness and resistance to humidity and solvent of the resulting lamp reflector are well-balanced, and (4) the hollow microspherical filler according to the present invention can be prepared from natural substances, so that the cost thereof is lower than those of other hollow fillers to bring about reduction in the costs of the composition and the molded article.

EXAMPLES

Examples 1 to 12 and Comparative Examples 1 to 6

A hollow microspherical filler (B) and a glass fiber (C) were added to a polyphenylene sulfide resin (a product of Kureha Chemical Industry Co., Ltd.; trademark "Fortlon KPS") each in an amount given in Table 1, followed by mixing for 2 minutes. The obtained mixture was extruded at a cylinder temperature of 310° C. to give a polyphenylene sulfide resin composition pellet.

This pellet was molded by using an injection molding machine at a cylinder temperature of 320° C. and a mold temperature of 150° C. into an ASTM test piece. This test piece was examined for physical properties.

The melt viscosity of the test piece was determined by the use of a capillary (10 mm × 1 mmφ) and a capillograph mfd. by Toyo Seiko under the conditions of 310° C. and a shear rate of 1200/sec. In order to determine the surface smoothness of a molded product, the above pellet was molded by the use of an injection molding machine at a cylinder temperature of 320° C. and a mold temperature of 150° C. into a flat plate (120 mm × 120 mm × 3 mm). This plate was examined for imaging properties by the use of a measuring device for imaging (mfd. by Suga Test Instruments Co., Ltd.) under the conditions of an optical comb of 1.0 mm and an angle of reflection of 45° C.

Further, the rupture cross-section of a molded article was observed with an electron microscope to determine the extent of the breakage of the hollow microspherical filler by the extrusion and the injection. The results are shown in Table 1.

For comparison, the results of the cases wherein other powdery or granular substances were used instead of the component (B) are also shown in Table 1 as Comparative Examples.

TABLE 1

Composition

TABLE 1-continued

| | (A) PPS resin (parts by weight) | (B) Inorganic filler (kind) | (B) Inorganic filler (parts by weight) | (C) glass fiber (13 μm × mm) (parts by weight) |
|---|---|---|---|---|
| Ex. 1 | 100 | Zeeosphere[a] | 5 | 0 |
| Ex. 2 | 100 | Zeeosphere[a] | 25 | 0 |
| Ex. 3 | 100 | Zeeosphere[a] | 70 | 0 |
| Ex. 4 | 100 | Zeeosphere[a] | 100 | 0 |
| Ex. 5 | 100 | Zeeosphere[a] | 150 | 0 |
| Ex. 6 | 100 | Zeeosphere[a] | 400 | 0 |
| Ex. 7 | 100 | Zeeosphere[a] | 100 | 10 |
| Ex. 8 | 100 | Zeeosphere[a] | 125 | 25 |
| Ex. 9 | 100 | Zeeosphere[a] | 100 | 100 |
| Ex. 10 | 100 | Zeeosphere[b] | 100 | 100 |
| Ex. 11 | 100 | Zeeosphere[c] | 100 | 100 |
| Ex. 12 | 100 | Zeeosphere[a] | 30 | 200 |
| Comp. Ex. 1 | 100 | glass bead | 150 | 0 |
| Comp. Ex. 2 | 100 | glass bead | 100 | 100 |
| Comp. Ex. 3 | 100 | calcium carbonate | 100 | 100 |
| Comp. Ex. 4 | 100 | glass balloon[d] | 100 | 100 |
| Comp. Ex. 5 | 100 | "shirasu" balloon[e] | 100 | 100 |
| Comp. Ex. 6 | 100 | | 0 | 70 |

| | Characteristics of molded article | | | | | | | |
|---|---|---|---|---|---|---|---|---|
| | Tensile strength (kgf/cm$^2$) | Tensile elongation (%) | Flexural strength (kgf/cm$^2$) | Flexural modulus (kgf/cm$^2$) | Specific gravity | Melt viscosity (poise) | Imaging properties | State of the filler present in the molded article |
| Ex. 1 | 1000 | 3.6 | 1200 | 39000 | 1.38 | 1400 | 91.2 | no breakage of hollow filler |
| Ex. 2 | 930 | 3.1 | 1150 | 72000 | 1.46 | 1720 | 88.7 | no breakage of hollow filler |
| Ex. 3 | 920 | 2.2 | 1020 | 80000 | 1.59 | 1840 | 83.8 | no breakage of hollow filler |
| Ex. 4 | 790 | 1.2 | 970 | 87000 | 1.65 | 1860 | 80.6 | no breakage of hollow filler |
| Ex. 5 | 700 | 0.7 | 950 | 110000 | 1.73 | 2000 | 73.1 | no breakage of hollow filler |
| Ex. 6 | 460 | 0.4 | 860 | 142000 | 1.89 | 4200 | 39.2 | no breakage of hollow filler |
| Ex. 7 | 850 | 1.1 | 1010 | 150000 | 1.68 | 1930 | 73.6 | no breakage of hollow filler |
| Ex. 8 | 940 | 0.8 | 1200 | 166000 | 1.75 | 2490 | 50.2 | no breakage of hollow filler |
| Ex. 9 | 1040 | 0.8 | 1610 | 200000 | 1.87 | 2850 | 27.6 | no breakage of hollow filler |
| Ex. 10 | 970 | 0.7 | 1540 | 189000 | 1.85 | 3000 | 25.5 | no breakage of hollow filler |
| Ex. 11 | 1120 | 0.8 | 1620 | 197000 | 1.89 | 2890 | 31.2 | no breakage of hollow filler |
| Ex. 12 | 1310 | 0.6 | 2200 | 220000 | 1.98 | 3350 | 27.5 | no breakage of hollow filler |
| Comp. Ex. 1 | 700 | 0.6 | 930 | 114000 | 1.87 | 3160 | 38.5 | |
| Comp. Ex. 2 | 1270 | 0.9 | 2080 | 192000 | 1.95 | 3850 | 11.5 | |
| Comp. Ex. 3 | 1410 | 0.9 | 2100 | 185000 | 2.00 | 4510 | 10.2 | |
| Comp. Ex. 4 | 1490 | 1.1 | 2020 | 161000 | 1.71 | 2780 | 12.8 | breakage of hollow filler |
| Comp. Ex. 5 | 1400 | 1.0 | 1800 | 158000 | 1.90 | 2620 | 18.4 | breakage of hollow filler |
| Comp. Ex. 6 | 1750 | 1.6 | 2500 | 130000 | 1.68 | 3070 | 9.8 | |

Notes:
[a]Aluminum silicate balloon mfd. by Zeelan, SiO$_2$: 52% by weight, Al$_2$O$_3$: 33% by weight, specific gravity: 2.1, average particle diameter: 10 μm.
[b]Aluminum silicate balloon mfd. by Zeelan, SiO$_2$: 54% by weight, Al$_2$O$_3$: 30% by weight, specific gravity: 1.9, average particle diameter: 56 μm.
[c]Aluminum silicate balloon mfd. by Zeelan, SiO$_2$: 49% by weight, Al$_2$O$_3$: 35% by weight, specific gravity: 2.2, average particle diameter: 5 μm.
[d]Glass balloon mfd. by Asahi Glass Co., Ltd., specific gravity: 0.58
[e]Shirasu (a white arenaceous sediment) balloon: SiO$_2$: 75% by weight, Al$_2$O$_3$: 14% by weight, specific gravity: 0.30, average particle diameter: 200 μm.

We claim:
1. A polyarylene sulfide resin composition consisting essentially of:
(A) a polyarylene sulfide resin and
(B) 5 to 400% by weight based on said polyarylene sulfide resin of a hollow microspherical filler which comprises 20 to 80% by weight of SiO$_2$ and 20 to 80% by weight of Al$_2$O$_3$ as major components and has a specific gravity of 1.0 to 2.5 and an average particle diameter of 1 to 100 μm.

2. A polyarylene sulfide resin composition as set forth in claim 1, which further contains (C) 10 to 200 percent by weight based on said polyarylene sulfide resin of a filler other than the component (B).

3. A polyarylene sulfide resin composition as set forth in claim 2, wherein said component (C) is glass fiber.

4. A molded article for light reflectance which is prepared by molding a polyarylene sulfide resin composition as set forth in any one of claims 1 to 3.

5. A polyarylene sulfide resin composition as set forth in claim 1, wherein said polyarylene sulfide comprises polyphenylene sulfide homopolymer.

6. A polyarylene sulfide resin composition as set forth in claim 1, wherein said polyarylene sulfide comprises at least 70 mole % of p-phenylene sulfide units.

7. A polyarylene sulfide resin composition as set forth in claim 6, wherein said polyarylene sulfide resin comprises 70 to 95 mole % of p-phenylene sulfide repeating units and 5 to 30 mole % of m-phenylene sulfide repeating units.

8. A polyarylene sulfide resin composition as set forth in claim 1, wherein said hollow microspherical filler comprises from 40 to 60% by weight of $SiO_2$ and 25 to 40% by weight of $Al_2O_3$.

9. A polyarylene sulfide resin composition as set forth in claim 1, wherein said hollow microspherical filler is added in amounts of from about 10 to 200% by weight based on said polyarylene sulfide.

10. A polyarylene sulfide resin composition as set forth in claim 3, wherein said hollow microspherical filler has a particle diameter of 2 to 60 μm.

11. A polyarylene sulfide resin composition as set forth in claim 1, which further contains (C) 10 to 130% by weight based on said polyarylene sulfide of a filler other than component (B).

12. A molded article prepared from the polyarylene sulfide resin composition of anyone of claims 5 to 7.

* * * * *